United States Patent [19]

Beyer et al.

[11] Patent Number: 5,494,692
[45] Date of Patent: Feb. 27, 1996

[54] PROCESS FOR PREPARING A LAYERED MULTI-COMPONENT FOOD PRODUCT

[75] Inventors: Hans-Joachim Beyer, Tuessling; Hans J. Jung, Muehldorf am Inn; Manfred Wild, Meitingen, all of Germany

[73] Assignee: Nestec S.A., Vevey, Switzerland

[21] Appl. No.: 252,247

[22] Filed: Jun. 1, 1994

[30] Foreign Application Priority Data

Jul. 12, 1993 [EP] European Pat. Off. ............... 93111111

[51] Int. Cl.$^6$ ............................ B65B 25/00; B65B 3/00
[52] U.S. Cl. .................. 426/393; 426/249; 426/130; 426/106; 53/440; 53/474; 62/63; 62/75; 141/9; 141/82
[58] Field of Search ........................ 426/393, 249, 426/130, 106; 53/474, 440; 62/75, 63; 141/9, 82

[56] References Cited

U.S. PATENT DOCUMENTS

| | | | |
|---|---|---|---|
| 2,435,094 | 1/1948 | Moser | 426/393 |
| 2,768,086 | 10/1956 | Bliley | 426/393 |
| 3,681,094 | 8/1972 | Rogers et al. | 426/90 |
| 3,685,308 | 8/1972 | Lundquist | 426/393 |
| 3,807,187 | 4/1974 | Vorel | 426/393 |
| 4,001,439 | 1/1977 | Zonni et al. | 426/249 |
| 4,318,935 | 3/1982 | Stussi | 426/393 |
| 4,594,253 | 6/1986 | Fradin | 426/393 |
| 4,717,571 | 1/1988 | Okonogi et al. | 426/249 |

FOREIGN PATENT DOCUMENTS

| | | |
|---|---|---|
| 0478316A1 | 4/1992 | European Pat. Off. . |
| 2049463 | 3/1971 | France . |
| 3712414 | 7/1960 | Japan ................. 426/249 |
| 61111660 | 5/1986 | Japan ................. 426/89 |
| 7213938 | 4/1973 | Netherlands ........... 426/249 |
| 1177354 | 1/1970 | United Kingdom . |

Primary Examiner—Steven Weinstein
Attorney, Agent, or Firm—Vogt & O'Donnell

[57] ABSTRACT

A multilayered food product, which has an upper component which has a density which is at least 0.2 kg/dm$^3$ greater than a density of a lower component, is prepared by introducing a first food component into a container and within 30 seconds after introduction of the first food component applying a CO$_2$ snow to a top surface of the first food component in the container for frosting the surface and removing residual CO$_2$ snow from the surface and introducing a second food component into the container onto the frosted surface of the first food component.

9 Claims, 1 Drawing Sheet

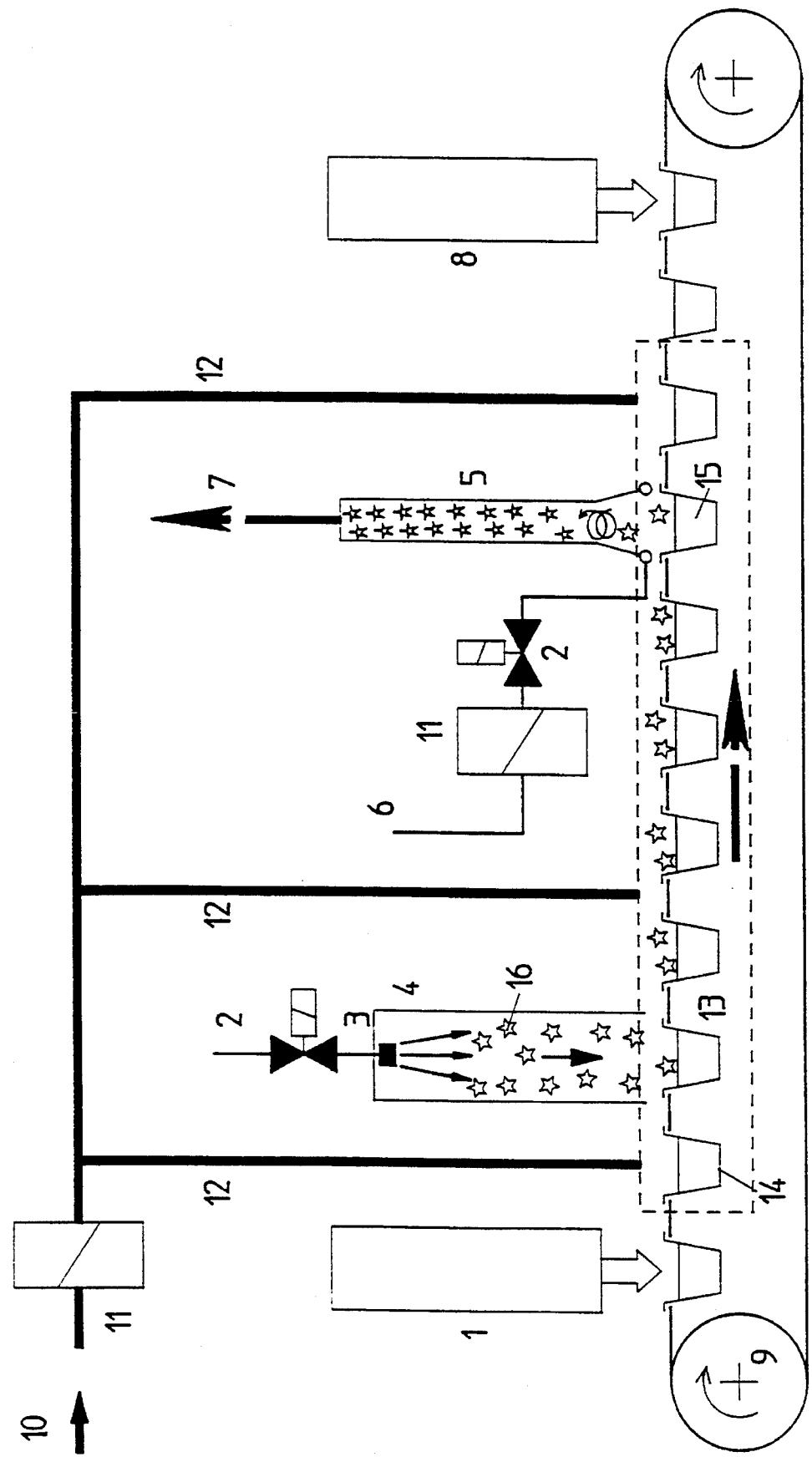

PROCESS FOR PREPARING A LAYERED MULTI-COMPONENT FOOD PRODUCT

BACKGROUND OF THE INVENTION

This invention relates to a process for preparing multilayer food product having component layers of different densities, wherein the product has been treated with $CO_2$ snow.

Multilayer food products in which the component with the higher density is on top are already known. However, they only keep for short periods and can only be produced by hand, the lower layer being placed in a container and transferred to a refrigerator to set, after which the upper layer is applied. The manual production process is too time-consuming to be carried out on a continuous industrial production line.

A process for the production of two fluid layers lying one on the other is described in European Patent No. 478 316. In this process, $CO_2$ snow is applied to a liquid surface. The disadvantage of this process is that complete and uniform covering of the surface with $CO_2$ snow cannot be guaranteed which leads to temperature differences on the surface. Secondly, it is necessary to wait until the $CO_2$ snow has completely sublimated which takes longer than 2 minutes and, hence, leads to an unacceptable extension of the production line.

SUMMARY OF THE INVENTION

The problem addressed by the present invention was to enable a multilayer food product to be continuously produced on an industrial scale in such a way that it would keep for 5 weeks at a temperature below 10° C.

Another problem addressed by the present invention was to provide a process and a machine for applying $CO_2$ snow to the surface of a food product which would enable the $CO_2$ to be uniformly distributed and would lead to a compact production line.

The invention relates to a multilayer food product which is accommodated in a container and comprises two components lying one above the other, wherein a component with a higher density is arrange over a component with a lower density, and which will keep in a cool place and which can be produced on an industrial scale and in which the difference in density between the two components is at least 0.2.

In the context of the invention, a pack is understood stood to be any container suitable for foods. Plastic cups, for example of polystyrene, polypropylene or glass, are particularly preferred.

A multilayer food product is understood to be a product which is made up of layers of different density and which may optionally contain other components, for example, cake or fruit preparations.

The term "food product" in the context of the invention encompasses dessert, meat mousse, jelly or meat-, fish- or vegetable-containing products.

In the multilayer food product according to the invention, the difference in density is preferably between 0.2 and 0.8. For example, the lower layer has a density of 0.4 to 0.8 while the upper layer has a density of 1 to 1.2. Throughout the present specification, density is expressed in $kg/dm^3$.

The lower layer may be mousse, such as foamed milk dessert or yoghurt, while the upper layer may be fruit jelly or chocolate. The upper layer has a thickness of preferably 1 to 8 mm or even more. Before introduction into the containers, these two components are pasteurized or UHT-treated so that the end product will keep for more than 5 weeks. Other components, for example slices of cake, fruit preparations or other layers, may also be embedded beneath the mousse.

The frosting process, as a whole, encompasses application of the $CO_2$ snow, its contact time and removal of the excess $CO_2$ snow under suction. It is integrated in both time and place in the process by which the individual components of the product are introduced. According to the invention, the surface of the product is frosted and hence solidified to a minimal depth of penetration, in contrast to standard practice where the product as a whole is frosted. This reduces on the one hand the outlay on machinery and on the hand the demand for $CO_2$ snow. The $CO_2$ snow is directly applied to the surface of the product. The contact time of the $CO_2$ is between 5 and 20 seconds, the $CO_2$ being applied to the surface at approximately −75° C. The contact time of the $CO_2$ snow is defined by the intermittence of the filling installation and the distance between the snow metering unit and the snow removal extraction suction unit.

The $CO_2$ snow is introduced all at once in a quantity of around 0.1 to 0.2 $g/cm^2$. Since complete sublimation cannot be achieved over a contact time of 20 seconds, provision has to be made for removal of the residue under suction.

To avoid the condensation of water, controlled air conditions must prevail between the introduction of the two components. By "controlled air conditions" is meant that the air must be dry and adjusted to a certain temperature.

When the surface of the first component is frosted, the second component of higher density may be applied thereto. The only requirement is that the surface of the first component should be uniformly and sufficiently frosted and should not be covered with any residual snow.

When the second component is applied, the temperature of the first component returns gradually to the filling temperature.

By virtue of the fact that the structure of the first (lighter) component has already set, there is no danger of the second (heavier) component sinking.

The $CO_2$ snow may be applied either intermittently or continuously.

A machine also is provided for carrying out the process described above, consisting of a station for introducing the first component, a station for introducing the second component and, between these two stations, a metering unit for metering $CO_2$ snow, the metering unit consisting of at least one nozzle at the upper end of an open-bottom hollow structure and additionally comprising a suction unit for the removal of $CO_2$ snow before introduction of the second component. The machine as a whole is integrated into a filling installation.

The machine as a whole is provided with a conditioning tunnel in the vicinity of the metering unit for $CO_2$ snow. In this conditioning tunnel, dry air is blown in to maintain the aerostatic conditions required to avoid the condensation of moisture.

The machine as a whole preferably operates intermittently, although continuous operation is also possible.

The stations at which the two components are introduced are part of a conventional filling installation which provides for aseptic or ultra-hygienic filling.

To obtain uniform distribution of the $CO_2$ snow, the nozzle is arranged at a distance of 20 to 80 cm from the surface of the first component. The hollow structure in which the nozzle is arranged, normally has a rotationally symmetrical shape.

The suction unit consists of a cylindrical hollow structure which substantially corresponds to the diameter of the product container. At least two nozzles for the introduction of compressed air are provided at the lower end of the structure near the surface of the first component. A preferred embodiment comprises four nozzles which are arranged at uniform intervals and which produce a circulating air jet to loosen up the snow. The snow thus loosened up is removed under suction through the cylindrical hollow structure.

To increase productivity, the machine comprises several filling lanes.

The invention is described in more detail in the following with reference to the accompanying drawing which diagrammatically illustrates the machine according to the invention.

BRIEF DESCRIPTION OF THE DRAWING

The FIGURE is a diagrammatic representation of the machine according to the invention.

DETAILED DESCRIPTION OF THE DRAWING

The machine according to the invention is integrated into an ultra-hygienic filling installation. It consists of a metering unit (1) for the first component, a metering unit (8) for the second component and a conditioning tunnel (13) which is arranged between the two metering units and which guarantees the maintenance of a minimum temperature and the necessary hygienic conditions. A snow metering unit (4) and a snow extraction unit (5) are provided above the conditioning tunnel.

In operation, the air conditions in the conditioning tunnel (13) are controlled by introduction of conditioned air (10) through suitable distributor nozzles at various positions (12). The air introduced is freed beforehand from microbial impurities in a sterile filter (11).

Open-top containers (14) are delivered to the metering station (1) for the first component by means of an intermittently operating conveyor belt (9). Other components of the multilayer dessert, such as cake or fruit preparations may already have been introduced beforehand. After a measured quantity of the first component has been introduced to fill to a surface level beneath the open-top, the container passes into the conditioning tunnel (13) under the effect of the intermittent advance of the conveyor belt. Under the snow metering unit (4), a quantity of 0.1 to 0.2 g/cm$^2$ of $CO_2$ snow (16) is applied to the surface of the first component. The $CO_2$ is produced by expansion of liquid $CO_2$ in one or more nozzles which are situated in a nozzle head (3) at the upper end of an open-bottom hollow structure. The snow can be introduced continuously or at intervals by means of a magnetic valve (2).

Under the effect of the $CO_2$ snow, the surface of the first component solidifies uniformly to the required depth. Sterile-filtered compressed air (6) tangentially injected intermittently at the snow extraction unit (5) produces an eddy current which loosens up the agglomerated $CO_2$ snow. The $CO_2$ snow thus loosened up is completely removed mechanically from the surface of the first component by a suction fan (7). Under the effect of the intermittent advance of the conveyor belt, the container with the frosted surface of the first component passes to the metering unit (8) for the second component where the second component is released intermittently for applying to the first component.

The surface frosting process may then be repeated at a second frosting unit to apply another component or, alternatively, the container may pass directly to the sealing unit where it is sealed.

The invention is illustrated by the following Example.

EXAMPLE

42% of skimmed milk is mixed at 70° C. with 20% of cream, 5% of sugar, 6.7% of condensate, 2% of skimmed milk powder and 20% of a gelatine-containing wild fruit preparation. The mixture is then UHT-treated at 140° C., cooled and then foamed to obtain an increase in volume of 90 %. The mousse is then introduced into the container through a metering nozzle.

The cup is passed beneath the snow metering unit where 7 g of $CO_2$ snow are applied to the surface.

After a contact time of 15 seconds, the remaining $CO_2$ is removed under suction. The surface as a whole has thus been cooled to a temperature of −50° C. and hence solidified. A layer of bilberries is then applied. It consists of 30% of bilberries, 42% of water, 25% of sugar and 1.2% of gelatine and is pasteurized or UHT-treated before application. The mousse has a density of 0.5 and a pH of approximately 4.6 while the fruit layer has a density of 1.2, a pH of 3.7 and a thickness of 5 mm.

We claim:

1. A process for preparing a layered multi-component food product comprising introducing a quantity of a first food component into an open-top container so that the first food component is contained in the container and has a top surface level at a position beneath the top of the container and so that space is provided in the container for introduction of a second food component into the container, wherein the first food component is one which solidifies upon being cooled and which, upon introduction, is not in solid form, and within 30 seconds after introduction of the first food component, sequentially:

(i) applying $CO_2$ snow to the top surface of the first food component, which is not in solid form, to provide a complete and uniform $CO_2$ snow-cover contacting the first food component top surface sufficient to frost the surface and obtain a portion of the first food component that is solidified from its top surface down to a depth sufficient to support a second food component having a density which is at least 0.2 kg/dm$^3$ greater than the density of the first food component;

(ii) applying suction from a mechanical unit source of suction directly to unsublimated residual snow-cover to remove the residual snow-cover from the top solidified surface of the first food component; and (iii) introducing a second food component, which has a density which is at least 0.2 kg/dm$^3$ greater than the density of the first food component, into the container and onto the top solidified surface of the first food component.

2. A process according to claim 1 further comprising, after applying the $CO_2$ snow and before applying suction to remove the residual snow-cover, directing compressed air towards the residual snow-cover to loosen the residual snow-cover from the top solidified surface of the first food component.

3. A process according to claim 1 or 2 wherein the first food component top surface is contacted with the snow-cover for between 5 seconds and 20 seconds.

4. A process according to claim 1 further comprising maintaining air conditions for avoiding condensation of moisture during $CO_2$ snow application and during application of suction.

5. A process according to claim 1 wherein the $CO_2$ snow is applied onto the first food component top surface in an amount of from 0.1 g/cm$^2$ to 0.2 g/cm$^2$.

6. A process according to claim 1 wherein the first and second food components differ in density in an amount of from 0.2 kg/dm$^3$ to 0.8 kg/dm$^3$.

7. A process according to claim 1 wherein the first food component has a density of from 0.4 kg/dm$^3$ to 0.8 kg/dm$^3$ and the second food component has a density of from 1 kg/dm$^3$ to 1.2. kg/dm$^3$ .

8. A process according to claim 1 wherein the first food component is a mousse.

9. A process according to claim 1 wherein the first food component is yogurt.

\* \* \* \* \*

UNITED STATES PATENT AND TRADEMARK OFFICE
CERTIFICATE OF CORRECTION

PATENT NO. : 5,494,692
DATED : February 27, 1996
INVENTOR(S) : Hans-Joachim Beyer, et al.

It is certified that error appears in the above-indentified patent and that said Letters Patent is hereby corrected as shown below:

On the title page, Item [75] Inventors; "Muehldorf am Inn" should read --Muehldorf Am In--.

On the title page, item [30] Foreign Application Priority Data, "93111111" should read --93111111.6--.

Column 1, line 7, after "preparing", insert --a--.
Column 1, between lines 47 and 48, insert the following heading and paragraph:
--DETAILED DESCRIPTION OF THE INVENTION The present invention also provides a process for the production of a mulitilayer food component in which a container is filled first with a first food component and then with a second food component, and before the second component is introduced, the surface of the first component is completely and uniformly frosted with $CO_2$ snow, a maximum time of 30 seconds elapsing between introduction of the two components, and residual $CO_2$ snow is removed under suction. Frosting of the surface enables components of relatively high density and relatively low viscosity to be applied without mixing or sinking.--.

Column 2, line 4, insert a comma after "example".

UNITED STATES PATENT AND TRADEMARK OFFICE
CERTIFICATE OF CORRECTION

PATENT NO. : 5,494,692

DATED : February 27, 1996

INVENTOR(S) : Hans-Joachim Beyer, et al.

It is certified that error appears in the above-indentified patent and that said Letters Patent is hereby corrected as shown below:

Column 2, line 23, delete "all at one".

Signed and Sealed this

Thirtieth Day of July, 1996

Attest:

BRUCE LEHMAN

*Attesting Officer*  *Commissioner of Patents and Trademarks*